United States Patent
Howe (10) Patent No.: US 11,650,969 B2
(45) Date of Patent: May 16, 2023

(54) QUADTREE TERRAIN DATA COMPRESSION USING DISTANCE-BASED PRUNING

(71) Applicant: Gulfstream Aerospace Corporation, Savannah, GA (US)

(72) Inventor: Gregory Howe, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 17/820,338

(22) Filed: Aug. 17, 2022

(65) Prior Publication Data

US 2022/0405258 A1    Dec. 22, 2022

Related U.S. Application Data

(63) Continuation of application No. 16/534,872, filed on Aug. 7, 2019, now Pat. No. 11,468,025.

(51) Int. Cl.
| | |
|---|---|
| *G06F 16/00* | (2019.01) |
| *G06F 16/22* | (2019.01) |
| *G06F 16/23* | (2019.01) |
| *G06F 16/29* | (2019.01) |
| *G08G 5/00* | (2006.01) |
| *G08G 5/02* | (2006.01) |

(52) U.S. Cl.
CPC ...... *G06F 16/2246* (2019.01); *G06F 16/2272* (2019.01); *G06F 16/2358* (2019.01); *G06F 16/29* (2019.01); *G08G 5/0004* (2013.01); *G08G 5/0017* (2013.01); *G08G 5/02* (2013.01)

(58) Field of Classification Search
None
See application file for complete search history.

(56) References Cited

U.S. PATENT DOCUMENTS

| | | | |
|---|---|---|---|
| 6,092,009 A | 7/2000 | Howard | |
| 6,317,690 B1 | 11/2001 | Gia | |

(Continued)

OTHER PUBLICATIONS

ICAO, ICAO Annex 15, Appendix 8 (Chapter 10), Nov. 10, 2016.

(Continued)

*Primary Examiner* — Jean M Corrielus
(74) *Attorney, Agent, or Firm* — LKGlobal | Lorenz & Kopf, LLP (57) ABSTRACT

A tree structure represents a terrain area as nested polygons organized in a parent-child relationship, each polygon associated to a specific geographic location. The tree structure defines at least one parent node and a plurality of child nodes, some being leaf nodes containing a height value. A processor uses a distance measure to change the tree structure topology assessing whether all leaf node children of a first parent node lie outside a predetermined distance from an aircraft runway, and if so, converting the first parent node into a leaf node by storing in the first parent node a height value representing the greatest of the respective height values of the leaf node children and by removing the leaf node children; and iteratively repeating for each remaining parent node until it has been determined that every remaining parent node in the data structure cannot be pruned without violating accuracy requirements.

10 Claims, 5 Drawing Sheets

(56) References Cited

U.S. PATENT DOCUMENTS

| | | | | |
|---|---|---|---|---|
| 6,347,263 | B1* | 2/2002 | Johnson | G08G 5/045 |
| | | | | 701/14 |
| 6,401,038 | B2 | 6/2002 | Gia | |
| 7,262,713 | B1* | 8/2007 | Vogl | G01C 23/00 |
| | | | | 340/961 |
| 7,680,350 | B2* | 3/2010 | Baxes | G06T 17/05 |
| | | | | 382/248 |
| 7,746,343 | B1* | 6/2010 | Charaniya | G06F 16/248 |
| | | | | 345/428 |
| 7,933,929 | B1 | 4/2011 | Mcclendon et al. | |
| 8,639,725 | B1 | 1/2014 | Udeshi et al. | |
| 8,976,168 | B2 | 3/2015 | Woodhouse et al. | |
| 9,123,160 | B1* | 9/2015 | Hollis | G06T 17/20 |
| 9,153,011 | B2 | 10/2015 | Vorhies | |
| 9,390,556 | B2 | 7/2016 | Masry | |
| 10,096,154 | B2 | 10/2018 | Liu et al. | |
| 11,312,379 | B2* | 4/2022 | Taylor | G06T 9/40 |
| 11,468,025 | B2* | 10/2022 | Howe | G08G 5/045 |
| 2001/0023390 | A1* | 9/2001 | Gia | G01S 13/935 |
| | | | | 701/14 |
| 2007/0182734 | A1* | 8/2007 | Levanon | G06T 17/005 |
| | | | | 345/420 |
| 2007/0247350 | A1 | 10/2007 | Ryan | |
| 2010/0013829 | A1 | 1/2010 | Baxes | |
| 2010/0033481 | A1* | 2/2010 | Baxes | G06T 17/20 |
| | | | | 345/420 |
| 2015/0169674 | A1 | 6/2015 | Greenfield et al. | |
| 2017/0103081 | A1 | 4/2017 | Jones et al. | |

OTHER PUBLICATIONS

Anonymous, OsgTerrainData—osgvisual, Feb. 21, 2016.
Adam Ciecko et al., Abstract Artificial Satellites, Dec. 1, 2013.
Unkown, Digital Terrain Model (High DEM Resolution)—Portail Open Data, Jul. 1, 2018.
Zhang, et al., A LOD algorithm based on out-of-core for large scale terrain rendering, 2013.
Shih-Yin Young, IEEE, Real-time 4-D trajectory planning for RNP flight operations, 2009.
Adam Ciecko, et al., Development of an integrated digital elevation model for safe takeoff and landing of the aircraft, Artificial Satellites, vol. 48 No. 4-2013, DOI: 10.2478/arsa-2013-0013, Nov. 19, 2013.
ICAO International standard and recommended practices, Annex 15, Aeronautical Information Services (Year: 2016).

\* cited by examiner

QUADTREE TERRAIN DATA COMPRESSION USING DISTANCE-BASED PRUNING

CROSS-REFERENCE TO RELATED APPLICATION

This application is a continuation of U.S. patent application Ser. No. 16/534,872, filed Aug. 7, 2019, and issued on Oct. 11, 2022 as U.S. Pat. No. 11,468,025, which is incorporated herein by reference in its entirety.

TECHNICAL FIELD

The disclosure relates generally to terrain avoidance and warning systems for aircraft. More particularly, the disclosure relates to a terrain height data structure for such terrain avoidance and warning systems populated using a distance-based pruning technique.

BACKGROUND

This section provides background information related to the present disclosure which is not necessarily prior art.

Modern aircraft include a range of different hazard protection systems, such as the terrain avoidance and warning system (TAWS). The TAWS is an example of an onboard hazard protection system designed to detect and alert when the aircraft is within a predetermined proximity to the earth (e.g. to the ground, or a ground-mounted structure, such as a building or communication tower. When an aircraft is thousands of feet above the ground, terrain avoidance is not an issue. Terrain avoidance issues come into play when the aircraft descends below about 1,000 feet above the surface of the earth, or 1,000 feet from any mountain, hill, or other obstruction to flight. In the United States, federal regulations detail these requirements. See 14 CFR 91.515, and 14 CFR 91.177, for example. Other jurisdictions have comparable regulations.

An aircraft will typically have several systems capable of assessing altitude, from which height above the ground can be calculated or inferred. The typical TAWS arrangement employs an on-board database system that correlates aircraft latitude-longitude (lat-lon) position to a stored ground elevation. A GPS system (or other navigation reference system) provides the aircraft's current lat-lon position, which is used to access the database to look up the ground elevation at the aircraft's position or in the aircraft's flight path. If the aircraft's flight path will take it too close to the ground (or a structure erected on the ground), the TAWS alerts the pilot and may also invoke other safety systems or autopilot systems.

Conventionally, the TAWS may be bundled as part of the cockpit avionics, such as the ground proximity warning system, and is typically separate from the aircraft flight control system (FCS).

In an aircraft designed to make long range flights, to anywhere on the globe, the on-board TAWS database can place heavy data storage demands on the avionics system hosting it. Simply stated, the earth has a large surface area. To capture the entire earth's surface in hi-resolution terrain data requires an enormous amount of storage—more than the available capacity of the typical FCS data storage resources. To put this in perspective, the high resolution terrain data obtained from the Shuttle Radar Topography Mission consumes 25 MB for a 1-degree latitude by 1-degree longitude square of data at 1-arc-second horizontal resolution. One-arc-second corresponds to a resolution of about 30 meters. A (lower resolution) 3-arc-second of data requires 3 MB of data. In either case, the storage requirements to capture the entire earth's surface is enormous.

In some product engineering scenarios, the solution would be simply: use a bigger, more powerful computer, with larger storage capacity. However, bigger is not always better in aircraft applications. Weight restrictions and other system design considerations prohibit any practical use of more powerful computers with larger storage capacity. Moreover, there are practical and regulatory reasons why it is not feasible to simply swap out the FCS computer for a larger model. It takes years to design, engineer and build a commercial or military aircraft, and in many cases it is simply not feasible to substitute a new component for an existing one that has already received regulatory approval and demonstrated robustness through rigorous testing. Thus a different solution is needed that will work with existing FCS computer systems.

SUMMARY

The disclosed system employs an efficient data compression technique, using distance-based pruning of a nested-polygon-based (e.g., quadtree) data structure, to provide high-resolution terrain height data where it is needed for aircraft take-off and landing maneuvers, while relaxing storage requirements where high-resolution data are not needed. Thus the disclosed system provides a data storage scheme that will accommodate current TAWS requirements, without straining existing FCS resources, for aircraft that are expected to make long range flights, to anywhere on the globe.

In one aspect, the disclosed system generates a compact terrain-height data store in non-transitory computer readable memory. A tree data structure, stored in non-transitory computer-readable memory, represents a terrain area as nested polygons organized in a parent-child relationship, each polygon having a node point that associates that polygon to a specific geographic location within the terrain area. The parent-child relationship of the tree data structure defines at least one parent node and a plurality of child nodes, where at least some of the child nodes are leaf nodes—nodes without children—that each store an elevation or height value. A distance calculator provides a geographic distance measure between a region within the terrain area containing at least one aircraft runway and the node point of at least one polygon.

A pruning processor uses the distance measure to change the topology of the tree data structure by (a) assessing whether the node points of all leaf node children of a first parent node lie within a predetermined geographic distance from the region containing the at least one aircraft runway, and if so, converting the first parent node into a leaf node by storing in the first parent node a height or elevation value representing the greatest of the respective height values of the leaf node children and by removing the leaf node children, and (b) iteratively repeating for each remaining parent node until it has been determined that every remaining parent node in the data structure cannot be pruned without violating a predetermined accuracy requirement.

In addition to pruning based on distance from a runway, the pruning processor also prunes based on a specified or predetermined vertical accuracy, which varies based on distance from the runway. For example, within 3 nautical miles of a runway, an application may require 45 meters of vertical accuracy. Therefore, for a parent node that is within the 3 nautical mile circle, the pruning processor compares the minimum and maximum elevations of its children and only prunes the leaves to their maximum value if the min-to-max delta is less than 45 meters. At greater distances from the runway, this value is increased to allow more coarsening of the data.

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The terrain data compression system employs a terrain database that is organized using a particular tree data structure, in which each parent-child level of the tree represents a different sized polygonal area of terrain. In this disclosure, a four-sided polygon (e.g. a square) has been chosen for illustration. Accounting for the fact that a parent square can be equally subdivided into four child squares, the disclosed tree data structure is referred to herein as a quadtree data structure. Other geometric shapes are also possible.

For example, in for production use, the polygons may be expressed as rectangles (instead of squares) at higher latitudes. This is because the lines of longitude get closer together as one gets nearer the poles, so squares in Lat/Lon axes are not squares in feet or meters. At the equator, a 1 arcsecond square is about 100×100 feet, but at 60 degrees latitude, it is still 100 feet North/South, but only 50 feet East/West. Therefore, a more efficient data storage technique would be to use low-level data elements that are 1 arcsec by 2 arcsec, instead of 1-by-1. One would stretch the cells even further at higher latitudes. Everything about the algorithm would remain essentially the same, just the low-level elements would be 1×2 or 1×4 rectangles instead of 1×1 squares.

Figure 1:
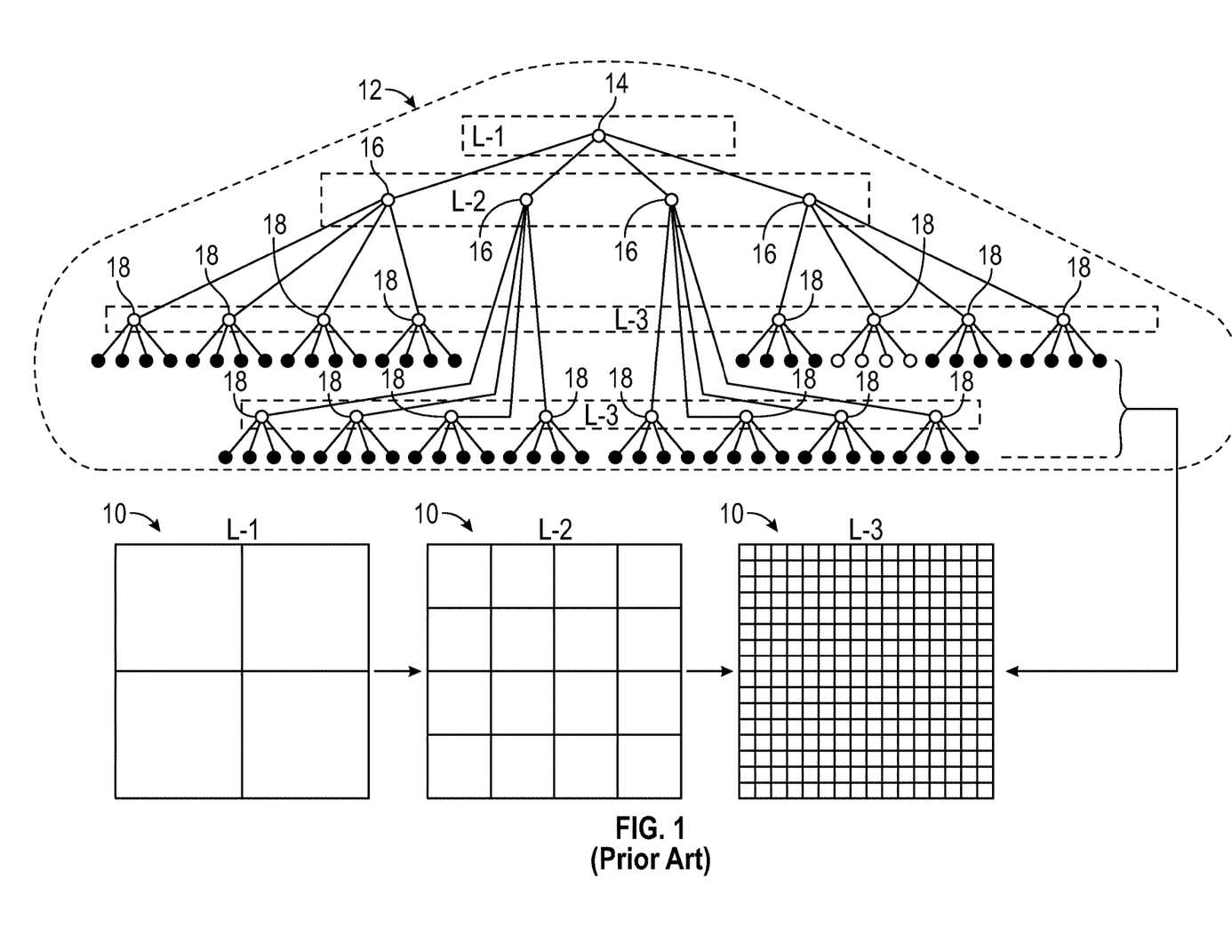
FIG. 1 depicts an exemplary quadtree data structure useful in understanding the disclosed compression technology.

FIG. 1 shows the basic concept of how a geographic region of terrain 10 may be subdivided into successively smaller regions of terrain. In FIG. 1, the geographic region of terrain 10 is subdivided into four nested child regions (shown at L-1), into sixteen nested child regions (shown at L-2) and into 256 child regions (shown at L-3). FIG. 1 also shows at 12 how the quadtree data structure represents these different levels (L-1 . . . L-3) of successively finer terrain resolution. While three successive subdivisions (L-1, L-2 and L-3) have been shown here, higher resolution is possible by increasing the number of levels of subdivision.

In the tree structure 12, the root node 14 has four child nodes 16, which in turn each have four child nodes 18. Note that in FIG. 1 all child nodes 18 are within the same level L-3, despite the staggered representation allowing the figure to fit on a single sheet. Each of the child nodes 18 have child nodes 20, which have been shaded (black) to indicate that these child nodes 20 are leaf nodes. Leaf nodes can be distinguished from other nodes because they have no children.

While it is possible to store terrain surface feature data in each of the nodes within the tree data structure, for purposes of supporting a terrain avoidance and warning system (TAWS) such surface detail is normally not required. Rather, all that is required to store a single height or elevation value in each of the leaf nodes. This height or elevation value indicates the tallest terrain feature within the geographic region represented by that leaf node. Thus a leaf node that happens to encompass Pikes Peak, Colo., would contain an elevation value of 14,115 ft. (4,302 m). While it is possible to also include manmade obstacles, such as radio antenna towers, as terrain surface features, in the database, a more practical implementation would store heights of manmade obstacles in a separate database, to allow that database to be managed differently and updated more frequently.

There is technical problem, as mentioned above, with representing height features for the entire navigable surface of the earth using a tree structure such as illustrated in FIG. 1. The amount of computer storage memory required to represent the navigable surface of the earth at resolutions needed during take-off, landing, and potentially other maneuvers greatly exceeds the capacity of modern day aircraft computer systems. Moreover, because terrain avoidance and other like safety measures rely on real-time data (or data very high data rates), conventional data compression algorithms, attempting to operate in real-time, often cannot keep up.

Figure 2:
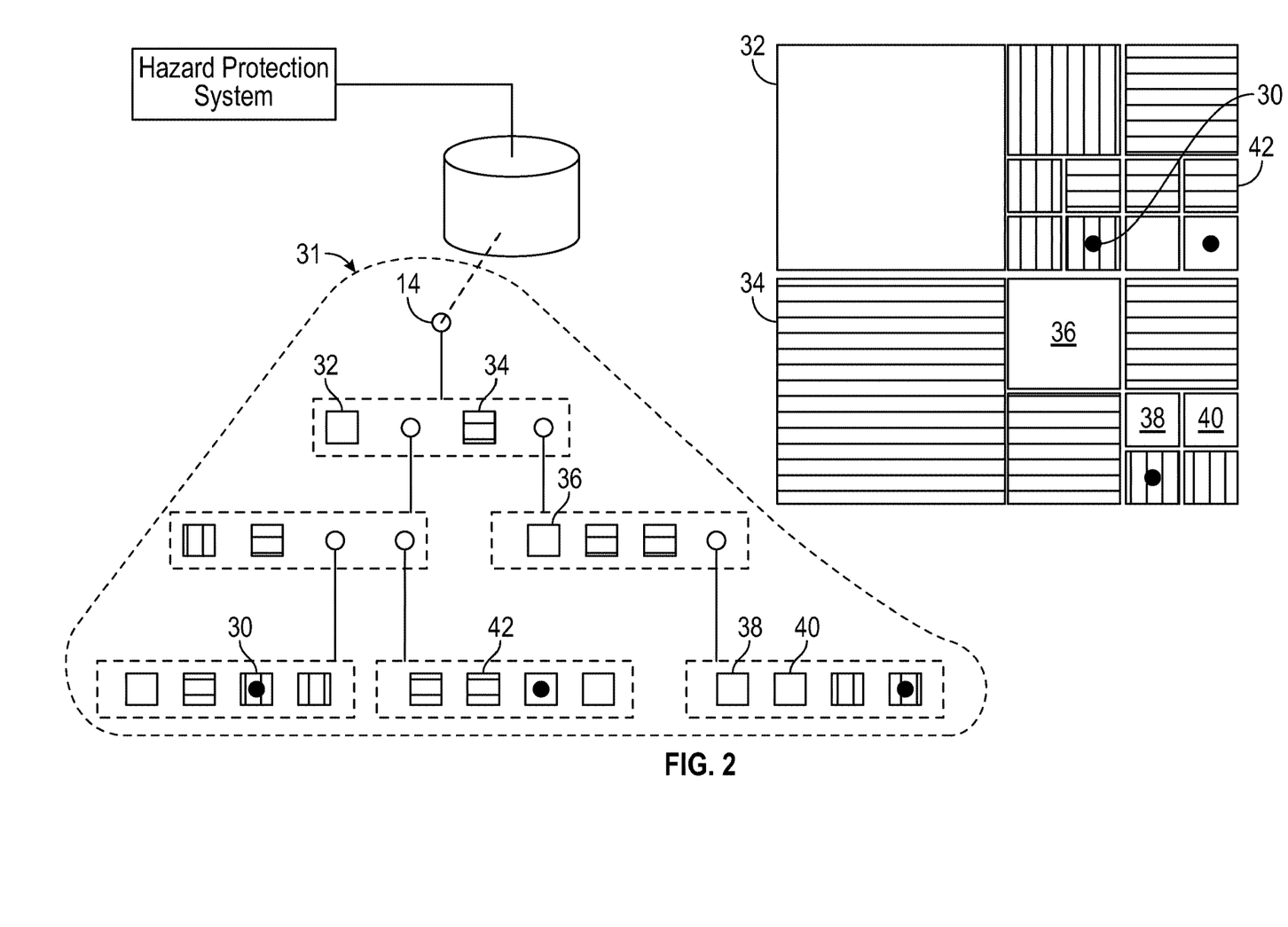
FIG. 2 depicts a pruned quadtree data structure for use in efficiently organizing a database used in a hazard protection system for aircraft.

Accordingly, the disclosed data compression technique uses a different approach in which the data are compressed by selective pruning of the tree data structure, based on a distance measure (e.g., distance from a relevant feature such as an airport, runway or suitable landing field). FIG. 2 shows what the pruned data structure might look like for an exemplary case where an aircraft runway is located at 30. In FIG. 2, striping or cross-hatching patterns have been used to differentiate the visual appearance of different squares for the reader's benefit, and are not intended to represent further subdivision into smaller cells. Unlike the tree data structure shown in FIG. 1, the tree data structure 31 in FIG. 2 has been pruned so that the leaf nodes do not all necessarily represent geographic terrain regions of the same size. As illustrated, some leaf nodes, such as nodes 32 and 34 represent terrain regions that are four times the area of node 36, and sixteen times that of nodes 38, 40 and 42, for example. The disclosed data compression algorithm has pruned the tree 31 and thus some regions of terrain far from the runway 30 can be represented at a much lower resolution. Thus the pruning compression technique alters the topology of the tree data structure so that no computer storage is wasted on terrain regions that are unsuitable for aircraft takeoff and landing, and to simplify areas without complex terrain that are away from runways.

In FIG. 2 there are several regions where higher resolution (smaller squares) have been retained. These regions would correspond to nodes that lie within a predetermined distance from a region containing at least one relevant aircraft runway, such as runway 30. Note that when one child node lies within a predetermined distance from a runway, all sibling nodes also retain their higher resolution status. For the reasons that will become clear through a study of FIG. 3, discussed below, the pruning compression technique treats all four sibling nodes the same: all are either (a) not pruned and continue to function as leaf nodes; or (b) pruned and pass the leaf node function to their parent.

Figure 3:
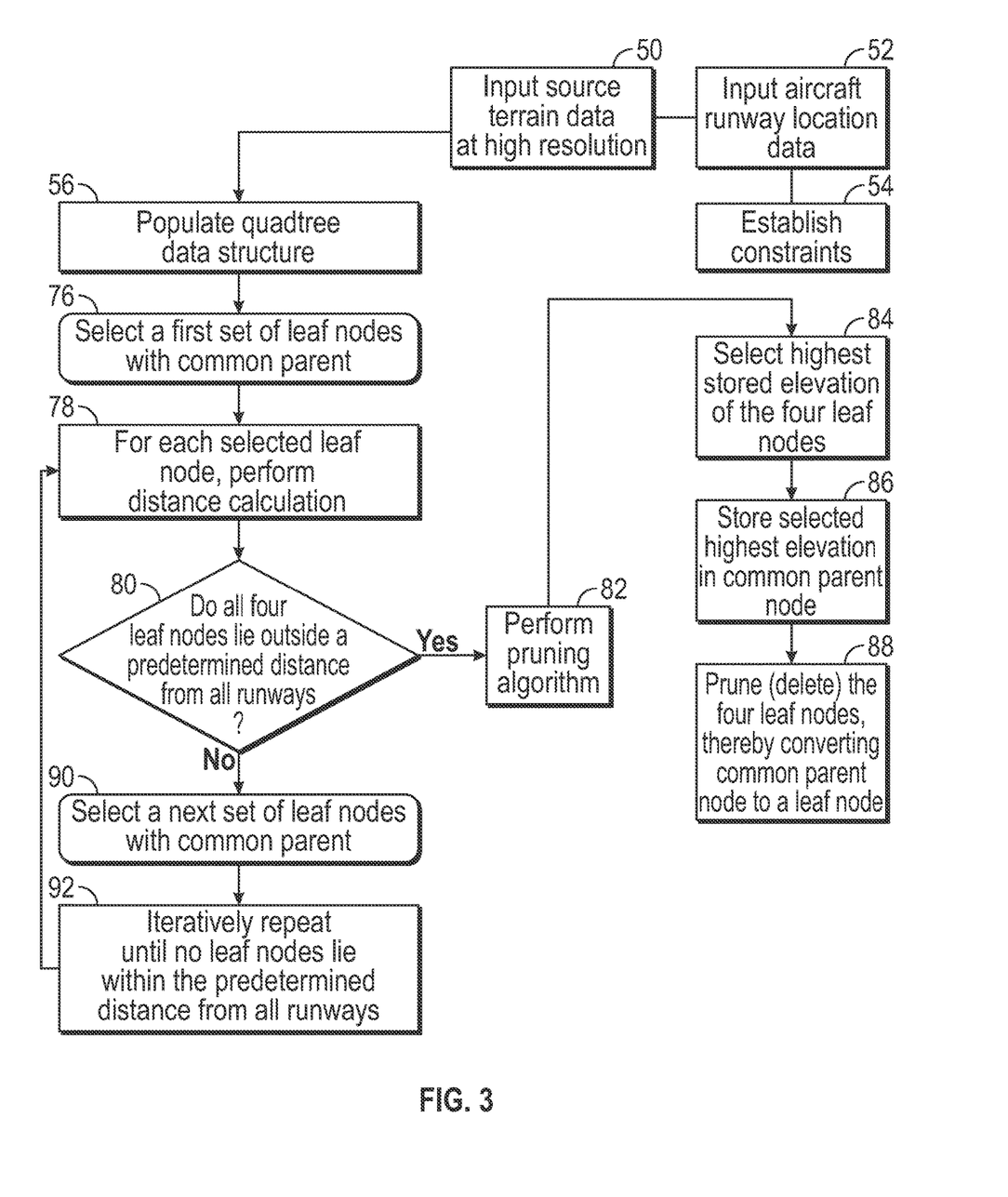
FIG. 3 is a flowchart diagram illustrating how the quadtree of FIG. 2 is generated using the pruning algorithm.

The computer-implemented pruning algorithm may be performed by a processor 101 (shown in FIG. 5) programmed to implement the pruning algorithm 103 (FIG. 5) steps illustrated in FIG. 3. To begin, input source terrain data are acquired at 50. Data are preferably acquired at the desired highest resolution. For example, data for step 50 may be sourced from the archived Shuttle Radar Topography Mission (SRTM) data available from the United States Geological Survey (USGS). For the disclosed embodiment high resolution of 1 arc-second is obtained for global coverage.

Also needed for the pruning algorithm is aircraft runway location data, which is acquired at step 52. If desired, the lat-lon locations of all available aircraft runways may be used as a starting data set, which data set may then be reduced in size by eliminating runways that are not relevant, i.e., not suitable for the particular type of aircraft for which the quadtree data structure is being developed.

Next a set of constraints is established at 54, specifying the minimum horizontal resolution and the minimum vertical accuracy of the desired end product database. The minimum horizontal resolution may be expressed in a linear dimension (such as inches, feet, centimeters, meters, etc.) which may then be correlated to an arc-second angular measure. For example, a 6 arcseconds minimum horizontal resolution requires grids or cells having an arc-second measure of $2^{-10}$ degrees. The minimum vertical accuracy may be specified in a linear dimension (such as feet, meters, etc.). For example, in metric system units, a practical minimum vertical resolution might be specified at 150 meters.

As will be explained, one objective of the pruning algorithm is to reduce the total data size by creating larger-sized grids (corresponding to larger terrain areas) where there are no relevant aircraft runways and/or the terrain complexity does not warrant using smaller terrain areas. The minimum horizontal resolution defines the smallest grid size that the pruning algorithm will create. Larger grid sizes are generated when child nodes within the quadtree data structure are pruned and the maximum of their collective terrain height is assigned to the larger-sized parent node. By such pruning, the total data size is reduced. The minimum vertical resolution also reduces total data size by constraining the accuracy with which terrain height values need to be stored.

Figure 4:
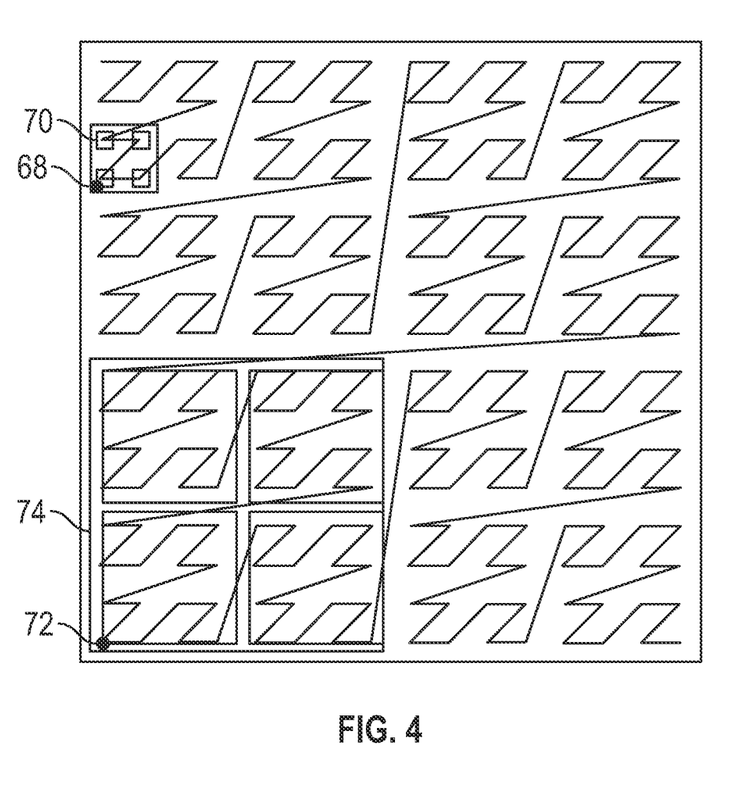
FIG. 4 explains the Z-order curve algorithm used to construct the quadtree data structure employed in the process depicted in FIG. 3.

Next the quadtree data structure is created and populated, beginning at 56. A grid is defined, at a resolution finer than the minimum horizontal resolution specified above. To construct a quadtree data structure 58 (FIG. 5) comprising three levels as illustrated in FIG. 1, a grid is defined starting with an arc-second resolution of $2^{-12}$ (two-orders of magnitude smaller than the minimum horizontal resolution). At this resolution, the individual grids or cells are 0.86 arcseconds by 0.86 arcseconds (square). At the outset, at step 56, the structure of the quadtree is built by creating an array of sequential records for each cell using a z-order curve algorithm. The z-order curve algorithm, shown in FIG. 4, is simply a predefined scheme for numbering the cells, so that an accessing algorithm can directly find the index of a particular cell by knowing where the cell is located in two-dimensional space. This initially defined grid (at the $2^{-12}$ degree resolution) is represented in computer memory as an array data structure 58 shown in FIG. 5.

Figure 5:
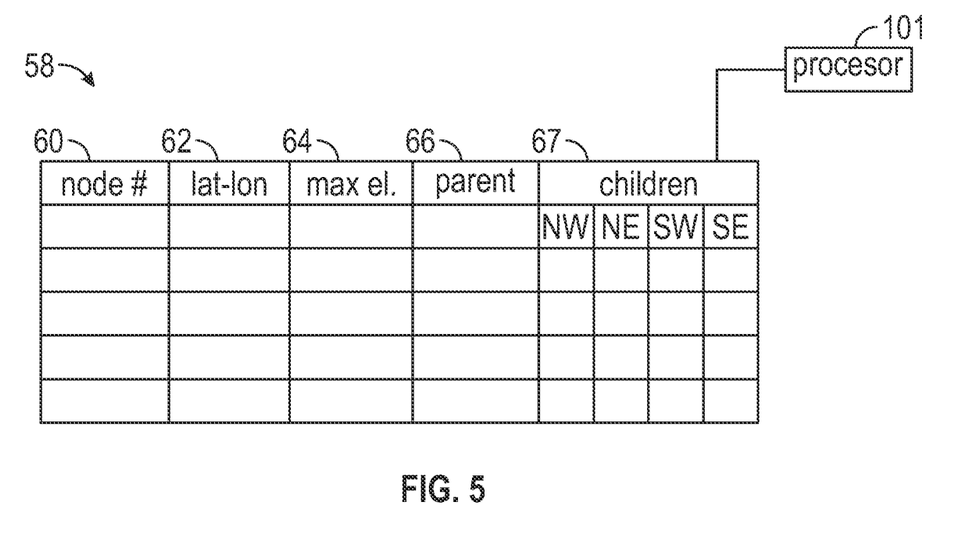
FIG. 5 is an exemplary matrix data structure used in conjunction with the pruning algorithm described in FIG. 3.

With reference to FIG. 5, data structure 58 has a record identified by a unique node number 60 for each grid, that is sequentially assigned when the z-order curve algorithm is used to define the array. Each record in the array data structure further includes lat-lon field 62 that stores a reference to the latitude and longitude of the geographic region with which that grid is associated. While any point on the grid may serve as the reference point, in the illustrated embodiment, the lower left corner of the grid is mapped to the latitude-longitude position on the terrain map data acquired in step 50. Each record also includes a maximum elevation field 64 that stores the height or elevation data obtained from the terrain data acquired at step 50.

If desired, to assist in pruning the database, the record may also include a parent pointer field 66 that may be populated with the index number of each child's parent node, although the parent pointer need not be stored in the final pruned data structure, as all navigation during use is "down" the tree, not "up." If a Z-order scheme has been used to organize the initial data structure, the leaf nodes of a common parent can be ascertained from the Z-order scheme. In this case it is not necessary to utilize a parent pointer field.

The data structure also include a child node pointer fields 67 to store pointers to each of the four child nodes. Because the z-order curve algorithm was used to construct the initial quadtree matrix, the parent nodes associated with all child nodes are known according to the fixed relationship defined by the z-order curve. To illustrate, see in FIG. 4, where node 68 serves as the parent node for the four cells contained within the larger square 70; and similarly see node 72 serves as the parent node for the four higher level squares contained within the still larger square 74.

Initially each cell at the highest resolution (cells of the smallest size) are considered leaf nodes—leaf nodes are nodes without children. The array data structure record for each such leaf node stores one terrain height or elevation value in its maximum elevation field. This value represents the tallest geological feature or manmade structure within the terrain represented by that cell. The pruning algorithm reduces the need to store such elevation data for terrain far from any relevant runway by subsuming small, high resolution cells into larger, low resolution parent cells when the elevation values in the smaller cells are similar enough to fall within the required vertical resolution.

Referring back to FIG. 3, the pruning algorithm performs its task iteratively, by selecting a first set of leaf nodes that share a common parent, as at 76. A distance calculation is then performed at 78 for each of the selected leaf nodes. The distance calculation may use, for example, the lat-lon position stored in the lat-lon field 62 of each cell and calculate the distance to each airport runway location, as obtained at step 52. Distance is generally calculated by computing the sum of the squares of the differences in the respective latitude and longitude positions to compute the square of the distance.

$$\text{distance} = \sqrt{(x_2-x_1)^2 + (y_2-y_1)^2}, \quad \text{Eq. 1}$$

where x represent longitude and y represent latitude values. However, in a presently preferred implementation, latitude and longitude are polar coordinates, while the distance requirements are linear, specified in nautical miles. To handle this the processor is programmed to scale the x- and y-distances separately by values of degrees-latitude-pernautical-mile and degrees-longitude-per-nautical-mile. These may be computed as functions of latitude based on the WGS 84 (World Geodetic System 1984) reference ellipsoid.

The calculated distance is then compared to a predetermined threshold distance, corresponding to a distance threshold inside which high resolution data should be preserved to preserve highest resolution near a runway. If desired, these threshold distances can be represented as distance squared values (distance$^2$), so that the requirement to take the square root in Eq. 1 can be dispensed with.

If all four leaf nodes of the current parent node fall outside the distance threshold and the difference between the minimum and maximum elevation is less than the coarser vertical resolution requirement, as at 80, then a pruning operation 82 is performed. In detail, the pruning operation entails, selecting the largest of the maximum elevation values 64 of the four leaf nodes, as at 84, storing the selected largest value in the maximum elevation field 64 of the common parent node, as at 86, and then pruning or deleting the four leaf nodes as at 88. This converts the common parent node to a leaf node—because it now has no children, and stores an elevation value as a leaf node.

The above procedure repeats by selecting the next set of leaf nodes having a common parent from the array data structure as at 90 and by then iteratively repeating as at 92, branching to 78, until no leaf nodes remain that lie within the predetermined distance from any relevant aircraft runway. Note that this iterative process takes into account leaf nodes that were generated as a result of the pruning operation 82. In other words, the iterative process continues for each remaining parent node until it has been determined that every remaining parent node in the data structure cannot be pruned without violating accuracy requirements.

Varying Terrain Accuracy Requirements

In one embodiment different vertical accuracy requirements are applied, based on the distance to a runway. For example, the vertical accuracy requirements may be specified in a piecewise or zone fashion, such as 45 meters within 5 nautical miles of a runway, 75 meters within 12 nautical miles of a runway, or 150 meters otherwise. The distance-to-runway calculation informs the algorithm which of these "zones" contains the terrain cell.

Each zone also has a specified horizontal resolution. The cells are automatically pruned to this level regardless of the vertical accuracy requirement. That is, cells within 5 nm of a runway are no smaller than 3 arcsec, regardless of the terrain, and cells more than 12 nm from an airport are no smaller than 30 arcsec, regardless of the terrain. The respective vertical and horizontal accuracy for the embodiment example discussed above are summarized in the following table.

| Distance to Runway (in nautical miles) | Vertical Accuracy | Horizontal Accuracy |
| --- | --- | --- |
| 3 nm | 75 m | 3 arcsec. |
| 12 nm | 150 m | 15 arcsec. |
| More than 12 nm | 300 m | 30 arcsec. |

The pruning operating then tests the difference between the minimum and maximum elevation within the parent node (i.e. of the four children). If the difference between the min and max is less than the required vertical accuracy for the "zone," the cells are pruned.

Note that the decision on whether or not to prune is highly dependent on the values of terrain within the parent node. This has the result of pruning the data more in areas of "simple terrain" and less in areas of "complex terrain." For example, the terrain in Savannah, Ga. is very flat, so the algorithm will prune the data to very coarse cells, may be as much as miles wide, even very close to the airport. By contrast, the terrain in the Rocky Mountains is very complex, so even away from airports the algorithm probably won't coarsen the data much beyond the horizontal resolution requirement.

After the above process has been completed, the data structure 58 may be distributed and used as non-transitory computer-readable medium storing a tree data structure that represents a terrain area as nested polygons organized in a parent-child relationship. As described, each polygon has a node point that associates that polygon to a specific geographic location within the terrain area, the parent-child relationship of the tree data structure defining at least one parent node and a plurality of child nodes. At least some of the child nodes are leaf nodes without children that each store a height value. The result is an asymmetrical pruned tree structure in which leaf nodes corresponding to regions within a predetermined distance from aircraft runways and/or regions of simpler terrain features correspond to a geometrically smaller region of terrain than leaf nodes corresponding to regions that lie outside the predetermined distance from aircraft runways and/or regions of more complex terrain features.

Pruned Quadtree Data Structure in Use

Figure 6:
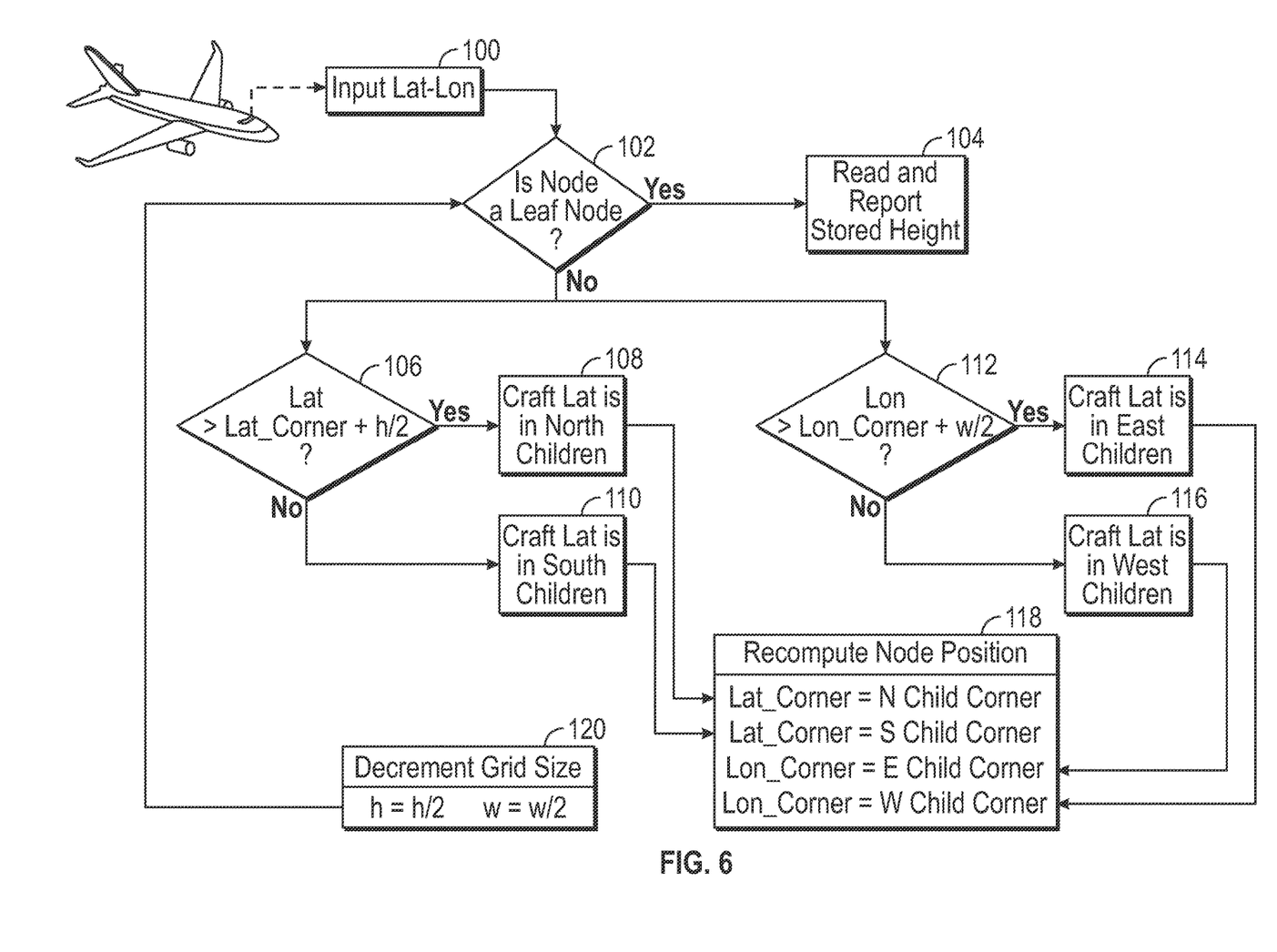
FIG. 6 is a flowchart illustrating how the pruned quadtree data structure is used.

For a more complete appreciation of how the pruned quadtree data structure is used, FIG. 6 illustrates how the data stored in the pruned quadtree data structure may be efficiently accessed to provide real-time terrain height information for use by hazard protection systems, such as a TAWS system. As explained above, each node of the pruned quadtree has an associated latitude and longitude coordinate. Because of the tree structure, the flight control computer (or other computer or processor that is hosting the applicable hazard protection system) can quickly find the applicable node in the tree for the aircraft's current lat-lon position by simply traversing the pointers that define the tree. The algorithm for traverses the tree structure pointers operates as follows.

The current latitude and longitude (lat-lon) 100 of the aircraft is input to the processor performing the hazard protection function, such as the terrain avoidance and warning function. Typically this would be a processor on-board the aircraft. Then using the input lat-lon value, the processor identifies the root node 14 (FIG. 1 or 2) that is associated with a root level square which contains the aircraft's current position. The processor checks at 102 whether the node currently being assessed (in this case, the root node 14) is itself a leaf node. Whether the node currently being assessed is a leaf node is readily ascertained by testing whether the node stores a value in its maximum elevation field 64 (FIG. 5). Leaf nodes are characterized in that they store maximum elevation field values and themselves have no child nodes. Thus if elevation value is stored, or if child node pointers do not exist for the currently assessed node then that node is a leaf node. If no maximum elevation value is stored, or if child node pointers exist for the currently assessed node then that node is a not leaf node.

If the processor determines at 102 that the currently assessed node is a leaf node, the processor reads the maximum elevation field 64 (FIG. 5) value stored in that node and reports the stored value to the hazard protection system for its use in performing the hazard protection function. Conversely, if the currently assessed node is not a leaf node, the processor descends into the next lower level of the tree structure by branching to steps 106 and 112, which separately for latitude and longitude determine which of the child nodes corresponds most closely to the aircraft's current lat-lon location.

FIG. 6 illustrates the example where the tree structure is a quadtree data structure comprising nested squares. Thus the processor follows the left branch at 106 to determine whether the aircraft latitude is in the northern half (108) or southern half (110) of the parent node. Concurrently the processor may also follow the right branch at 112 to determine whether the aircraft longitude is in the eastern half (114) or western half (116) of the parent node. These decisions can be conveniently determined by assessing whether the aircraft's current latitude (at 106) and longitude (at 112) is greater than the midpoint of the currently assessed node. The latitude midpoint may be readily calculated as one-half the height (h) of the square associated with the currently assessed node; the longitude midpoint may readily be calculated as on-half the width (w) of that square. The reader will of course appreciate that all sides a square are equal in length, and thus for the quadtree data structure height h=width w. However, in full-globe implementations, the tree structure may comprise stretched cells near the poles where the width may be 2×, 4×, or 8× the height when measured in arcseconds.

Steps 106 and 112 collectively determine which of the four child quadrants is closest to the aircraft's lat-lon position. The illustrated algorithm assesses this by determining if the aircraft's latitude is above the midpoint between the north child and south child, and by determining if the aircraft's longitude is to the right of the midpoint between the east child and west child. The same can be equivalently determined by testing whether the aircraft lat-lon position is below the latitudinal midpoint and below the longitudinal midpoint; or in different combinations of the above less-than, greater-than permutations.

By determining which quadrant the aircraft's lat-lon position is closest to, the processor then assembles the needed information to determine or recompute at 118 a new node position, one level lower in the tree data structure. Thus at step 118, the processor determines a new latitude-longitude corner, corresponding to the identified child grid square. As illustrated, if the aircraft's latitude is within the north child grid square, the north child grid squares corner defines the new latitude node position pointer; conversely, if within the south child grid square, the south child grid square corner defines the new latitude node position pointer. Similarly, if the aircraft's longitude is within the east child grid square, the east child grid squares corner defines the new longitude node position pointer; and, if within the west child grid square, the west child grid square corner defines the new longitude node position pointer.

Having thus identified a new node, one level deeper from the root node 14, the processor decrements the variables used to specify grid size of the new node, at step 120, and then the decision logic again tests at step 102 whether the new node is a leaf node, again reading and reporting the stored height at 104 if the new node is a leaf node.

The processor will continue to operate in this fashion, successively visiting nodes deeper and deeper into the tree structure until a leaf node is finally identified at 102.

By employing a tree data structure with linked parent child pointers, the search algorithm illustrated in FIG. 6 is quite efficient. In big O notation (a computer science algorithm classification) the search time for the search algorithm is O(n), where n is the number of refinement levels. The search algorithm merely needs to descend into the tree structure until it reaches a leaf node, and the terrain height value is then efficiently retrieved. Because the tree was pruned a priori, there is no wasted space storing terrain height information for areas that are not relevant.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method of providing terrain height data for an aircraft safety system to use during landing, comprising:
  storing terrain height data in a non-transitory computer-readable medium configured as a tree data structure that represents a terrain area as nested polygons organized in a parent-child relationship, each polygon having a node point that associates that polygon to a specific geographic location within the terrain area, the parent-child relationship of the tree data structure defining at least one parent node and a plurality of child nodes, where at least some of the child nodes are leaf nodes without children that each store a height value,
  wherein the tree data structure defines an asymmetrical pruned tree structure in which leaf nodes corresponding to regions within a predetermined distance from aircraft runways correspond to a geometrically smaller region of terrain than leaf nodes corresponding to regions that lie outside the predetermined distance from aircraft runways;
  supplying a current geographic location of the aircraft to a processor coupled to the computer-readable medium, the processor being programmed to:
    a) identify a root node within the tree data structure that corresponds to the current geographic location of the aircraft;
    b) assess whether the identified root node is a leaf node and if so, obtain a terrain height value from the identified root node and provide the obtained terrain height to the aircraft safety system;
    c) assess whether the identified root node is not a leaf node and if so, descend to a next lower level of the tree data structure by assessing which one child node of the root node corresponds to a geographic location closest to the current geographic location of the aircraft;
    d) repeating steps a) through d) using the one child node in the role of the root node.

2. The method of claim 1 wherein the processor and computer-readable medium are disposed on the aircraft.

3. The method of claim 1 wherein only nodes without child nodes store a height value.

4. The method of claim 1 wherein step b) of assessing whether the identified root node is a leaf node is performed by testing whether the identified root node stores a height value.

5. The method of claim 1 wherein step b) of assessing whether the identified root node is a leaf node is performed by testing whether the identified root node lacks a child node.

6. The method of claim 1 wherein the tree data structure represents geographic location in terms of latitude and longitude values.

7. The method of claim 1 wherein step c) of assessing which one child node is closest to the current geographic location of the aircraft is performed by expressing the current geographic location of the aircraft in terms of a current latitude and a current longitude, and separately assessing:

which one of a plurality of latitudinally disposed child nodes is closest to the current latitude; and which one of a plurality of longitudinally disposed child nodes is closest to the current longitude; and selecting as the one child node, that which qualifies as said one of a plurality of latitudinally disposed child nodes and said one of a plurality of longitudinally disposed child nodes.

8. The method of claim 1 wherein the tree structure is a quad tree structure in which an internal node has four child nodes, each corresponding to one of the following four relative positions: north-west, north-east, south-west, south-east.

9. The method of claim 8 wherein step c) of assessing which one child node is closest to the current geographic location of the aircraft is performed by selecting one of the four child nodes that is closest to the current geographic location of the aircraft.

10. The method of claim 1 wherein the stored terrain height data corresponds to a value of maximum height associated with each terrain area.

\* \* \* \* \*